(12) United States Patent
Tazawa

(10) Patent No.: US 8,916,783 B2
(45) Date of Patent: Dec. 23, 2014

(54) POS SYSTEM

(75) Inventor: Hideyuki Tazawa, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/821,507

(22) PCT Filed: Mar. 11, 2011

(86) PCT No.: PCT/JP2011/056496
§ 371 (c)(1),
(2), (4) Date: Mar. 7, 2013

(87) PCT Pub. No.: WO2012/063505
PCT Pub. Date: May 18, 2012

(65) Prior Publication Data
US 2013/0175099 A1    Jul. 11, 2013

(30) Foreign Application Priority Data
Nov. 9, 2010  (JP) .................................. 2010-251040

(51) Int. Cl.
*G01G 19/40* (2006.01)
*G07G 1/00* (2006.01)

(52) U.S. Cl.
CPC .............. *G01G 19/40* (2013.01); *G07G 1/0072* (2013.01)
USPC ........................................ 177/25.13; 705/23

(58) Field of Classification Search
USPC ................... 705/15, 16, 21, 23, 24; 177/25.11–25.15, 25.19, 50, 1, 4
See application file for complete search history.

(56) References Cited

U.S. PATENT DOCUMENTS

| 4,787,467 A | * | 11/1988 | Johnson | 177/50 |
| 5,307,250 A | * | 4/1994 | Pearson | 362/101 |
| 5,730,252 A | * | 3/1998 | Herbinet | 186/52 |
| 5,937,386 A | * | 8/1999 | Frantz | 705/15 |

(Continued)

FOREIGN PATENT DOCUMENTS

| CN | 1791894 A | 6/2006 |
| CN | 1892715 A | 1/2007 |

(Continued)

OTHER PUBLICATIONS

International Search Report for PCT/JP2011/056496 dated Apr. 19, 2011.

(Continued)

*Primary Examiner* — Randy W Gibson
*Assistant Examiner* — Natalie Huls
(74) *Attorney, Agent, or Firm* — Sughrue Mion, PLLC

(57) ABSTRACT

A POS system includes: input means for receiving an input of an order; memory means for storing item information containing an individual theoretical weight of each item; calculating means for calculating, based on input information containing item types and item quantities of ordered items and on the item information, a theoretical total weight of the ordered items; weight measuring means for measuring an actual total weight of the ordered items, which are put in a bag; judging means for comparing the theoretical total weight and the actual total weight, and when there is a weight difference therebetween, identifying a side item and/or included item close in weight to the weight difference from among the ordered items; and output means for outputting the identified side item and/or included item as an item candidate corresponding to the weight difference.

9 Claims, 9 Drawing Sheets

```
WEIGHT CHECK: NG

60g UNDERWEIGHT.

EGG: 2
SLOW-COOKED EGG: 1
MISO SOUP: 1
```

(56) References Cited

U.S. PATENT DOCUMENTS

| | | | |
|---|---|---|---|
| 6,115,695 A * | 9/2000 | Kern | 705/23 |
| 6,168,076 B1 * | 1/2001 | Yamamoto et al. | 235/7 R |
| 6,384,348 B1 * | 5/2002 | Haga et al. | 177/25.15 |
| 6,471,125 B1 | 10/2002 | Addy | |
| 6,687,680 B1 * | 2/2004 | Iguchi et al. | 705/16 |
| 8,037,969 B2 * | 10/2011 | Curt et al. | 186/41 |
| 2004/0143512 A1 * | 7/2004 | Sturr, Jr. | 705/26 |
| 2004/0262391 A1 | 12/2004 | Harris et al. | |
| 2005/0273345 A1 * | 12/2005 | Castillejo Romero | 705/1 |
| 2006/0235755 A1 * | 10/2006 | Mueller et al. | 705/15 |
| 2007/0007078 A1 | 1/2007 | Johnson et al. | |
| 2008/0077455 A1 * | 3/2008 | Gilboa | 705/5 |
| 2008/0249899 A1 * | 10/2008 | Nasser | 705/28 |
| 2009/0265247 A1 * | 10/2009 | Carroll et al. | 705/15 |
| 2011/0071912 A1 * | 3/2011 | McNamara et al. | 705/15 |

FOREIGN PATENT DOCUMENTS

| | | |
|---|---|---|
| JP | 62-125497 A | 6/1987 |
| JP | 6-4773 A | 1/1994 |
| JP | 2000-289721 A | 10/2000 |
| JP | 2001-34840 A | 2/2001 |
| JP | 2007-34789 A | 2/2007 |
| WO | 03/007256 A2 | 1/2003 |

OTHER PUBLICATIONS

Office Action issued by the People's Republic of China dated Aug. 16, 2013 in counterpart Application No. 201180039395.0.

Communication dated Mar. 6, 2014, issued by the European Patent Office in corresponding Application No. 11840195.9.

* cited by examiner

| ITEM CODE | ITEM NAME | PRICE (YEN) | WEIGHT (g) | PARTICULAR ITEM AGGREGATION FLAG | MAIN/SIDE FLAG |
|---|---|---|---|---|---|
| 0001 | BEEF BOWL | 300 | 400 | | 1 |
| 0002 | SET A (BEEF BOWL, EGG) | 330 | 460 | 1 | 1 |
| 0003 | SET B (BEEF BOWL, SLOW-COOKED EGG) | 350 | 460 | 2 | 1 |
| 0004 | EGG | 50 | 60 | 1 | 2 |
| 0005 | SLOW-COOKED EGG | 70 | 60 | 2 | 2 |
| 0006 | MISO SOUP | 100 | 100 | | 2 |
| 0007 | KENCHIN VEGETABLE SOUP | 150 | 200 | | 2 |
| 0008 | SALAD A | 100 | 100 | | 2 |
| 0009 | SALAD B | 120 | 150 | | 2 |
| 0010 | SALAD C | 140 | 200 | | 2 |

FIG. 5

| PARTICULAR ITEM AGGREGATION FLAG | ITEM NAME | WEIGHT (g) |
|---|---|---|
| 1 | EGG | 60 |
| 2 | SLOW-COOKED EGG | 60 |

FIG. 6

| ORDER SLIP NUMBER | 10 |
| --- | --- |
| ADDITIONAL ORDER NUMBER | 00 |
| ORDER CLASSIFICATION | 0 |

| ITEM CODE | ITEM NAME | PRICE (YEN) | WEIGHT (g) | PARTICULAR ITEM AGGREGATION FLAG | MAIN/SIDE FLAG | QUANTITY |
| --- | --- | --- | --- | --- | --- | --- |
| 0002 | SET A (BEEF BOWL, EGG) | 330 | 460 |  | 1 | 1 |
| 0004 | EGG | 50 | 60 | 1 | 2 | 1 |
| 0005 | SLOW-COOKED EGG | 70 | 60 | 1 | 2 | 1 |
| 0006 | MISO SOUP | 100 | 100 | 2 | 2 | 1 |
| 0007 | KENCHIN VEGETABLE SOUP | 150 | 200 |  | 2 | 1 |
| 0009 | SALAD B | 120 | 150 |  | 2 | 1 |
| TOTAL | | 820 YEN | | | | |
| THEORETICAL TOTAL WEIGHT | | | 1030 g | | | |

INCLUDED ITEM/SIDE ITEM IN ORDER INFORMATION

| ITEM NAME | WEIGHT (g) | QUANTITY |
| --- | --- | --- |
| EGG | 60 | 2 |
| SLOW-COOKED EGG | 60 | 1 |
| MISO SOUP | 100 | 1 |
| KENCHIN VEGETABLE SOUP | 200 | 1 |
| SALAD B | 150 | 1 |

FIG. 7

| DIGIT | ITEM | DESCRIPTION | REMARKS |
|---|---|---|---|
| 1ST DIGIT | START CHARACTER | a FIXED | |
| 2ND DIGIT | TOTAL WEIGHT (g) | DIGIT OF TEN THOUSAND OF TOTAL WEIGHT | EXPRESSES UP TO 99.999 kg IN 5 DIGITS (ERROR-FREE WEIGHT) |
| 3RD DIGIT | | DIGIT OF THOUSAND OF TOTAL WEIGHT | |
| 4TH DIGIT | | DIGIT OF HUNDRED OF TOTAL WEIGHT | |
| 5TH DIGIT | | DIGIT OF TEN OF TOTAL WEIGHT | |
| 6TH DIGIT | | DIGIT OF ONE OF TOTAL WEIGHT | |
| 7TH DIGIT | ORDER IDENTIFICATION NUMBER | ORDER CLASSIFICATION | 0=POS ORDER, 1=HT ORDER |
| 8TH DIGIT | | DIGIT OF TEN OF ORDER SLIP NUMBER | ORDER SLIP NUMBER (2 DIGITS) |
| 9TH DIGIT | | DIGIT OF ONE OF ORDER SLIP NUMBER | |
| 10TH DIGIT | | DIGIT OF TEN OF ADDITION NUMBER | ADDITIONAL ORDER NUMBER (00=NEW, 01-99=ADDITION/CANCEL) |
| 11TH DIGIT | | DIGIT OF ONE OF ADDITION NUMBER | |
| 12TH DIGIT | STOP CHARACTER | a FIXED | |

FIG. 9

WEIGHT CHECK: NG

60g UNDERWEIGHT.

EGG: 2
SLOW-COOKED EGG: 1
MISO SOUP: 1

FIG. 10

WEIGHT CHECK: NG

60g UNDERWEIGHT.

EGG: 2,   SLOW-COOKED EGG: 1

FIG. 11

WEIGHT CHECK: NG

60g UNDERWEIGHT

ONE EGG OR ONE SLOW-COOKED EGG IS NOT IN.

FIG. 12

POS SYSTEM

CROSS REFERENCE TO RELATED APPLICATIONS

This application is a National Stage of International Application No. PCT/JP2011/056496 filed Mar. 11, 2011, claiming priority based on Japanese Patent Application No. 2010-251040 filed Nov. 9, 2010, the contents of all of which are incorporated herein by reference in their entirety.

TECHNICAL FIELD

This invention relates to a POS system.

BACKGROUND ART

As a detecting system for detecting whether sales items are correctly packed in a package, there has conventionally been known a detecting system including: sales items memory means for storing sales items in response to information input to a cash register; commodity information memory means for storing a weight of each commodity as well as a weight of a package; sensing means for measuring an overall weight of the package in which the items are packed; and control means for calculating, based on the information stored in the sales items memory means and the information stored in the commodity information memory means, an overall weight of the package in which the items are packed, and for judging whether the sales items are correctly packed in the package based on a comparison between the calculated overall weight and the overall weight measured by the sensing means (see, for example, Patent Literature 1).

As a similar conventional technology, there has also been known an electronic cash register system including: an electronic cash register having a function of calculating the total of registered articles; and a scale for weighing an article, the electronic cash register including: set value storing means for storing a set weight of each article; adding means for adding the set weight of an article each time the article is registered; total weight storing means for storing the weights added by the adding means; and comparing means for comparing the total weight value stored by the total weight storing means and a measured value obtained when all the articles are weighed by the scale (see, for example, Patent Literature 2).

Citation List

Patent Document 1: Japanese Unexamined Patent Application Publication (JP-A) No. 2000-289721
Patent Document 2: Japanese Unexamined Patent Application Publication (JP-A) No. 2001-34840

DISCLOSURE OF THE INVENTION

Problem to be Solved by the Invention

The detecting system described in Patent Literature 1 and the electronic cash register system described in Patent Literature 2 are configured to notify, when there is a missing or mistaken item, an operator or the like of an error message, but do not get to the point where candidates of the missing or mistaken item are identified. Therefore, there has been a problem in that the item verification by the notified operator still takes time.

In view of the above, this invention has been made to solve the problem inherent in the conventional technologies, and therefore has an object to provide a POS system capable of improving the work efficiency regarding the item verification.

Means to Solve the Problem

A POS system according to this invention includes: input unit for receiving an input of an order; memory unit for storing item information containing an individual theoretical weight of each item; calculating section for calculating, based on input information containing item types and item quantities of ordered items input with the input unit and on the item information, a theoretical total weight of the ordered items; weight measuring unit for measuring an actual total weight of the ordered items, which are put in a bag; judging section for comparing the theoretical total weight and the actual total weight, and when there is a weight difference therebetween, identifying a side item and/or included item close in weight to the weight difference from among the ordered items; and output unit for outputting the side item and/or included item identified by the judging section as an item candidate corresponding to the weight difference. The POS system according to this invention thus solves the above-mentioned problem.

Effect of the Invention

According to this invention, when there is a weight difference of a predetermined value or more between the actual total weight and the theoretical total weight of the ordered items and a missing item is implied, not only the notification is made of the missing item but also candidate items of the missing item are identified and output. Therefore, the work efficiency regarding the item verification by the operator or the like may be improved, and improvements in operational efficiency and customer satisfaction may be realized.

Further, according to this invention, side items and/or included items which are prone to be missing may be extracted as the item candidates of the missing item corresponding to the weight difference, to thereby realize the accurate and efficient identification of the item candidates.

BRIEF DESCRIPTION OF THE DRAWING

FIG. 5 is an explanatory diagram illustrating an example of an item master file.
FIG. 6 is an explanatory diagram illustrating an example of an included item file.
FIG. 7 is an explanatory diagram illustrating an example of order information.
FIG. 9 is an explanatory diagram illustrating an example of a barcode data configuration.
FIG. 10 is an explanatory diagram illustrating an example of an error message.
FIG. 11 is an explanatory diagram illustrating a modified example of the error message.
FIG. 12 is an explanatory diagram illustrating another modified example of the error message.

BEST MODE FOR EMBODYING THE INVENTION

A POS system according to an embodiment of this invention is hereinafter described with reference to the drawings. Note that, the term "main item" as used herein refers to an item dealt with as a main item such as a beef bowl, and the term "side item" refers to an item dealt with as a subitem such as an egg or miso soup. The term "set item" refers to a combination of a main item and a side item sold as a set of items, and the term "included item" refers to the side item included in the set item.

Embodiment

Figure 1:
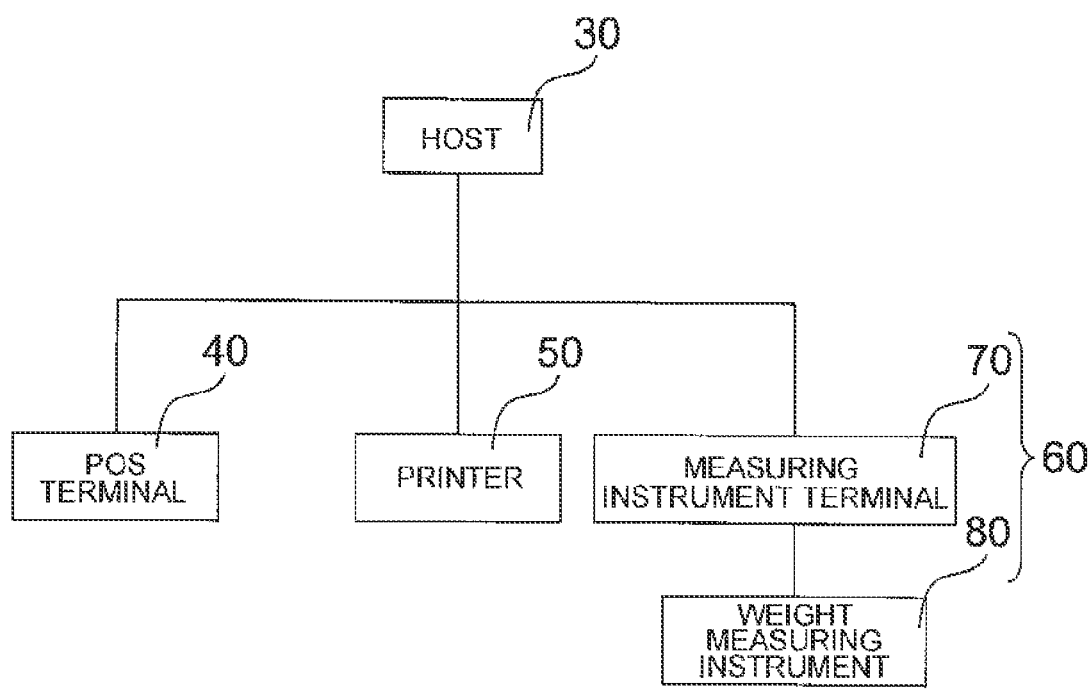
FIG. 1 is a schematic diagram illustrating a POS system according to an embodiment of this invention.

As illustrated in FIG. 1, the POS system according to the embodiment of this invention includes at least a host 30, a POS terminal 40, a printer 50, and a weight checker 60 consisting of a measuring instrument terminal 70 and a weight measuring instrument 80.

Note that, for an instrument configuration that is not highly relevant to this invention, a description thereof is omitted. Further, an instrument that is described in this embodiment as a single instrument may be constituted of a plurality of separate instruments. For example, the host 30 may be constituted of a plurality of servers or databases. To the contrary, instruments described in this embodiment as a plurality of separate instruments may be configured as a unit. For example, the host 30 and the POS terminal 40 may be configured as a unit, or the measuring instrument terminal 70 and the weight measuring instrument 80 may be configured as a unit.

The host 30 and each of the POS terminal 40, the printer 50, and the measuring instrument terminal 70 are connected to each other via a line such as a LAN, and the measuring instrument terminal 70 and the weight measuring instrument 80 are connected to each other via a communication cable such as a USB cable. Note that, each of the above-mentioned connections between the instruments is merely an example, and the form of connection between the instruments may be a dedicated line, the Internet, a LAN (including a wireless LAN), a communication cable, and the like.

The POS terminal 40 includes a memory unit, an input unit, an output unit, a control unit, a communication unit, an auxiliary storage device, and the like, and operates the control unit in accordance with software loaded onto the memory unit. The control unit is constituted of a CPU or the like, and the memory unit is constituted of a ROM, a RAM, or the like.

The POS terminal 40 is configured to receive an input regarding an order from a customer, and transmit input information including the types, quantities, and the like of the ordered items to the host 30 via the communication unit. In this manner, the POS terminal 40 in this embodiment serves as input unit for receiving an input of an order. The POS terminal 40 also serves as settling means for settling the price (payment) of the order of the customer. Note that, the order input unit may be provided to another instrument. Also in this case, the input information is transmitted to the host 30.

Figure 2:
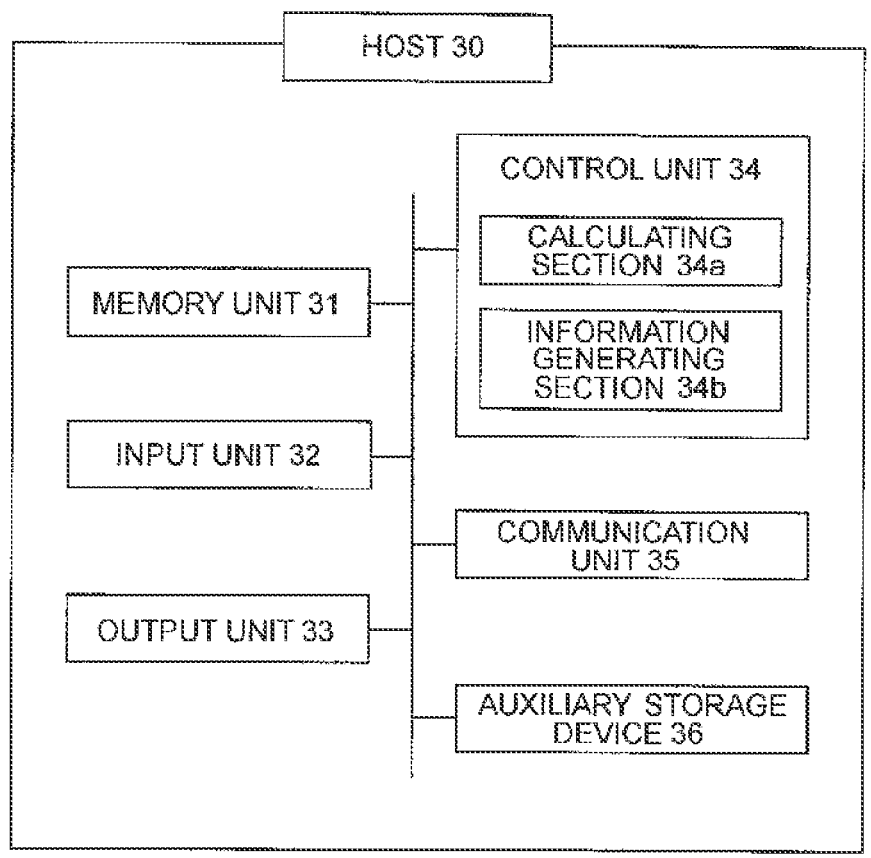
FIG. 2 is a block diagram illustrating a configuration of a host.

As illustrated in FIG. 2, the host 30 includes a memory unit 31, an input unit 32, an output unit 33, a control unit 34, a communication unit 35, an auxiliary storage device 36, and the like, and operates the control unit 34 in accordance with software loaded onto the memory unit 31 to realize the sections described below. The control unit 34 is constituted of a CPU or the like, and the memory unit 31 is constituted of a ROM, a RAM, or the like.

The memory unit 31 of the host 30 stores in advance at least an item master file (item information) as illustrated in FIG. 5, and an included item file (item information) as illustrated in FIG. 6.

As illustrated in FIG. 5, the item master file is constituted of an item code, item name, item price, individual theoretical weight, particular item aggregation flag, and main/side flag of each item. Similarly, as illustrated in FIG. 6, the included item file is constituted of a particular item aggregation flag, item name, and individual theoretical weight of each included item. The term "main/side flag" as used herein indicates whether each item is a main item or a side item, with the values "1" and "2" indicating a main item and a side item, respectively. When an item is sold as a side item, and the same item as the side item is also sold as an included item of the set item, a particular item aggregation flag having the same value is given to both the side item and the set item.

As illustrated in FIG. 2, the control unit 34 of the host 30 includes a calculating section 34a and an information generating section 34b.

The calculating section 34a calculates a theoretical total weight of the items based on the input information received from the POS terminal 40 and the item master file stored in the memory unit 31.

The information generating section 34b generates, based on the theoretical total weight calculated by the calculating section 34a, the input information received from the POS terminal 40, and the item master file and the included item file, which are stored in the memory unit 31, order information as illustrated in FIG. 7. As illustrated in FIG. 7, the order information contains, in addition to an order slip number, an order classification, an additional order number, and the item code, item name, item price, individual theoretical weight, particular item flag, main/side flag, quantity, total amount, and theoretical total weight of each ordered item, the item name, individual theoretical information, and quantity of the ordered side item and/or included item. The order information is registered to the memory unit 31.

Figure 8:
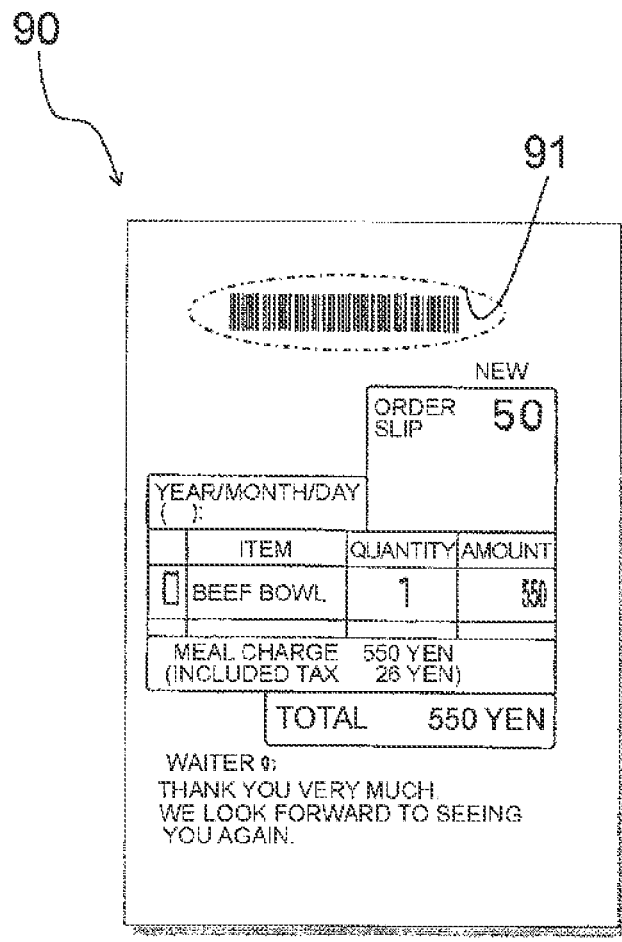
FIG. 8 is a schematic view illustrating an example of a floor order slip.

The printer (issuing unit) 50 receives the order information from the host 30 and prints a floor order slip 90 as illustrated in FIG. 8. On the floor order slip 90, as illustrated in the alternate long and short dash line of FIG. 8, in addition to the item name, a payment amount, the order slip number, and the like, a one-dimensional barcode (identification code) 91 is printed. As illustrated in FIG. 9, the barcode 91 contains, as data, the theoretical total weight of the item, and an order identification number consisting of the order slip number, the order classification, and the additional order number. The order identification number may consist only of the order slip number. Note that, the barcode 91 may contain only the order identification number. Further, in this embodiment, the one-dimensional barcode is used as the identification code, but the identification code may be a two-dimensional code or the like.

Figure 3:
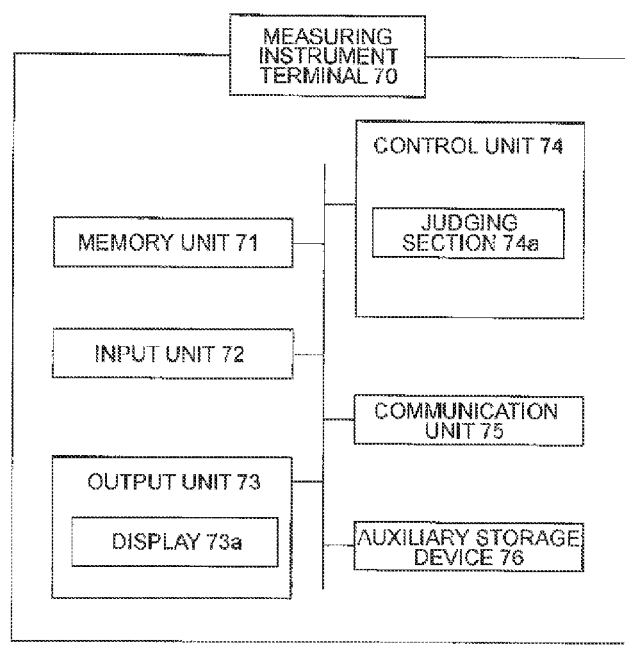
FIG. 3 is a block diagram illustrating a configuration of a measuring instrument terminal.

As illustrated in FIG. 3, the measuring instrument terminal 70 includes a memory unit 71, an input unit 72, an output unit 73, a control unit 74, a communication unit 75, an auxiliary storage device 76, and the like, and operates the control unit 74 in accordance with software loaded onto the memory unit 71 to realize the sections described below. The control unit 74 is constituted of a CPU or the like, and the memory unit 71 is constituted of a ROM, a RAM, or the like.

The memory unit 71 of the measuring instrument terminal 70 stores the order information received from the host 30. The order information is acquired and stored by the measuring instrument terminal 70 regularly or at arbitrary timing.

The output unit 73 of the measuring instrument terminal 70 includes at least a display (output unit, display unit) 73a. Note that, the display 73a in this embodiment has a touch panel function and also serves as the input unit 72. Further, in this embodiment, as the display unit for displaying candidates of a missing item or an error message, the display 73a of the measuring instrument terminal 70 is used. However, the embodiment mode of the display unit is not limited thereto, and for example, other display unit may be provided independently. Alternatively, as the output unit, in place of the above-mentioned display unit, printing unit may be provided for printing.

The control unit 74 includes a judging section 74a.

The judging section 74a compares an actual total weight, which is to be described below, of the items measured by the weight measuring instrument 80 and the theoretical total weight of the items in the order information of the order identification number identified by a barcode reader 82, which is to be described below, and when there is a weight difference of a predetermined value (in the case of this embodiment, 30 g) or more between the actual total weight and the theoretical total weight, identifies, based on the numerical value of the weight difference and the order information received from the host 30, only a predetermined number of (in the case of this embodiment, three) side items and/or included items close in weight to the weight difference from among the ordered items in the order from the item having the closest weight. Then, the side items and/or included items having the identified weight are displayed as item candidates corresponding to the weight difference on the display 73a of the measuring instrument terminal 70. Note that, the predetermined value is a value smaller than the weight of the item having the smallest weight of the side items and included items, and is registered in advance to the host 30 and may be changed afterward.

Figure 4:
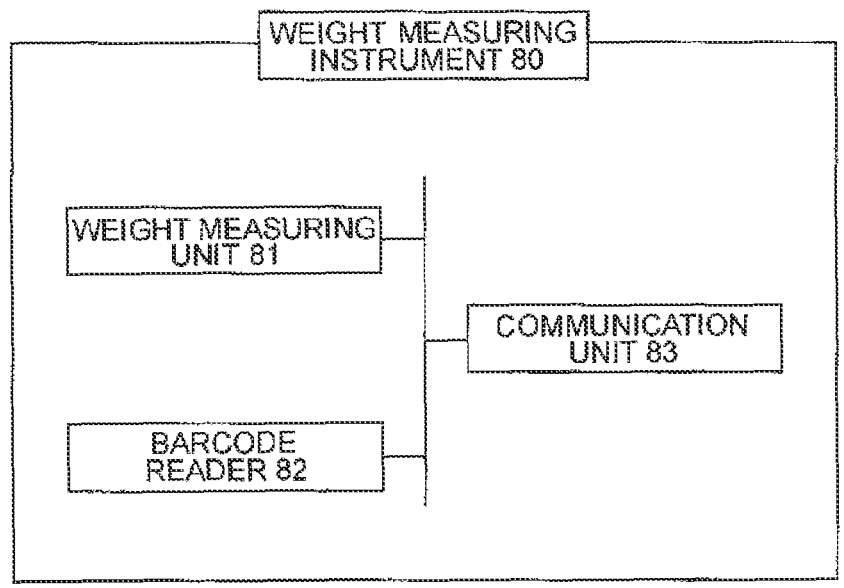
FIG. 4 is a block diagram illustrating a configuration of a weight measuring instrument.

As illustrated in FIG. 4, the weight measuring instrument 80 includes at least a weight measuring unit 81 for measuring items, which are put in a bag, the barcode reader (reading unit) 82 for reading a barcode 91 of the floor order slip 90, a communication unit 83, and the like, and is configured to transmit, to the measuring instrument terminal 70 connected thereto via the communication cable, a result of the measurement by the weight measuring unit 81 and the order identification number read by the barcode reader 82. Note that, the barcode reader 82 may be provided in another place, for example, in the measuring instrument terminal 70.

Next, a flow of an operation using the POS system according to this embodiment is described below.

In this example, a store in which the POS system according to this embodiment is placed is a restaurant that sells a beef bowl and the like as items, and a customer orders, as illustrated in FIG. 7, "Set A (beef bowl and egg)/quantity: 1, egg/quantity: 1, slow-cooked egg/quantity: 1, miso soup/quantity: 1, Kenchin vegetable soup/quantity: 1, and salad B/quantity: 1" as takeout items.

First, an operator who has taken the order from the customer uses the POS terminal 40 to input types and quantities of the ordered items and whether or not the items are to go. The input information is transmitted to the host 30.

The calculating section 34a of the host 30 calculates, based on the input information received from the POS terminal 40, and the item master file stored in the memory unit 31, the theoretical total weight of the ordered items. In the case of this embodiment, as illustrated in FIG. 7, the theoretical total weight of the ordered items is 1,030 g.

Further, the information generating section 34b of the host 30 generates, based on the theoretical total weight calculated by the calculating section 34a, the input information received from the POS terminal 40, and the item master file and the included item file, which are stored in the memory unit 31, the order information as illustrated in FIG. 7.

The printer 50 receives the order information from the host 30 and prints the floor order slip 90 as illustrated in FIG. 8. On the floor order slip 90, as illustrated in FIG. 8, the barcode 91 is printed in addition to the item name, the payment amount, the order slip number, and the like. Note that, the payment operation with the customer may be performed at arbitrary timing.

The order information of the customer is transmitted to a kitchen terminal such as a kitchen printer (not shown) or the like and output from the kitchen terminal to give an instruction to cook.

When the cooking is complete, the operator puts the items in a bag and moves the items in the bag to the vicinity of the weight checker 60 along with the floor order slip 90 issued from the printer 50.

The operator next reads the barcode 91 of the floor order slip 90 with the barcode reader 82 and uses the weight measuring unit 81 to measure the weight of the items in the bag. The actual total weight of the items put in the bag in this embodiment is 970 g.

The actual total weight of the items measured by the weight measuring unit 81 and the data of the barcode 91 read by the barcode reader 82 are transmitted to the measuring instrument terminal 70, and the judging section 74a of the measuring instrument terminal 70 compares the actual total weight (970 g) of the items and the theoretical total weight (1,030 g) of the items in the order information corresponding to the read order identification number. Based on the fact that the weight difference therebetween is 60 g, the judging section 74a judges that the weight difference is the predetermined value (in this embodiment, the predetermined value is 30 g) or more, and identifies only the predetermined number of (in the case of this embodiment, three) side items and/or included items close in weight (unit weight) to the weight difference of 60 g in the order from the item having the closest weight from among the ordered side items and/or included items. In the case of this embodiment, side items and/or included items close in weight to the weight difference of 60 g are determined to be "egg (60 g), slow-cooked egg (60 g), and miso soup (100 g)". Note that, in the case where the barcode 91 includes the theoretical total weight, the theoretical total weight may be used in the comparison with the actual total weight.

Then, the "egg, slow-cooked egg, and miso soup," which are the side items and/or included items identified by the judging section 74a of the measuring instrument terminal 70, are displayed on the display 73a as item candidates which are prone to be missing as illustrated in FIG. 10, along with a message that the weight check has turned out to be NG, the quantity of each item, the numerical value of the weight difference, and a message that the items are underweight.

Note that, in the above-mentioned example, the weight difference exceeds the predetermined value, and hence an error message as illustrated in FIG. 10 is displayed. However, if the weight difference between the weights is within the predetermined value range, a message that the weight check has turned out to be OK is displayed on the display 73a.

Further, in the above-mentioned embodiment, the case where the actual total weight is less than the theoretical total weight has been described. However, in a case where the actual total weight exceeds the theoretical total weight, in place of the message that the bag is underweight, a message that the items are overweight is displayed, and items close in weight to the weight difference is displayed. Alternatively, in the case where the actual total weight exceeds the theoretical total weight, a configuration may be adopted in which only the message that the weight check has turned out to be NG, the numerical value of the weight difference, and the message that the items are overweight may be displayed without identifying the side items and/or included items corresponding to the weight difference.

Further, in a case where the communication between the host 30 and the measuring instrument terminal 70 cannot be performed and the order information stored in the memory unit 31 of the host 30 cannot be acquired by the measuring instrument terminal 70, the following configuration may be adopted: the judging section 74a of the measuring instrument terminal 70 uses the theoretical total weight read by the barcode reader 82 and the actual total weight measured by the weight measuring unit 81 to judge only whether or not the weight difference between the weights exceeds the predetermined value (30 g); and when the weight difference is over the predetermined value, the message that the weight check has turned out to be NG is displayed on the display 73a, and when the weight difference does not exceed the predetermined value, the message that the weight check has turned out to be OK is displayed on the display 73a.

According to this invention obtained as described above, when there is a weight difference of the predetermined value or more between the actual total weight and the theoretical total weight of the ordered items and a missing item is implied, in addition to the notification of the missing item, item candidates of the missing item are identified and displayed. Therefore, the work efficiency regarding the item verification of the missing item by the operator or the like may be improved, and improvements in operational efficiency and customer satisfaction may be realized.

Further, operations of the operator added as a result of the introduction of the POS system according to this invention are only the following two operations: the weight measurement of the items in the bag with the weight measuring instrument 80; and the scanning of the barcode 91 with the barcode reader 82. Therefore, a significant increase in operational load of the operator may be avoided.

According to this invention, the side items and/or included items with high possibilities of missing are extracted as the item candidates of the missing item corresponding to the weight difference. Therefore, the accurate and efficient identification of the candidate items may be realized.

Further, the data of the barcode 91 includes the theoretical total weight of the items in addition to the order identification number. Therefore, if the communication between the host 30 and the measuring instrument terminal 70 cannot be performed and the order information stored in the memory unit 31 of the host 30 cannot be acquired by the measuring instrument terminal 70, the judging section 74a may use the theoretical total weight read by the barcode reader 82 and the actual total weight measured by the weight measuring unit 81 to judge whether or not the weight difference therebetween exceeds the predetermined value.

Note that, the above-mentioned embodiment describes that, when the weight difference exceeds the predetermined value, the predetermined number of side items and/or included items are identified and displayed. However, when the weight difference exceeds the predetermined value, all side items and/or included items contained in the order information illustrated in FIG. 7 may be displayed as the candidates of the missing item, along with the quantities of the items.

Further, in the above-mentioned embodiment, when the weight difference exceeds the predetermined value, the predetermined number of identified side items and/or included items is set to three. However, for example, the predetermined number may be set to one. In this case, the side item and/or included item closest in weight to the weight difference is identified. This is described in terms of the above-mentioned embodiment. As illustrated in FIG. 11, "egg (60 g) or slow-cooked egg (60 g)" closest in weight to the weight difference of 60 g is identified and displayed on the display 73a.

Further, in addition to the condition on whether or not the weight difference exceeds the predetermined value, a further condition may be set. For example, a configuration may be adopted in which, when the weight difference falls within a predetermined range (for example, within the range of 90% to 110%) of the weight of the side item and/or included item closest in weight to the weight difference, one side item and/or included item closest in weight to the weight difference is identified and displayed, and when the weight difference does not fall within the range, on the other hand, the predetermined number of side items and/or included items close in weight to the weight difference may be identified and displayed in the order from the closest item. This is described in terms of the above-mentioned embodiment. The weight difference is 60 g and falls within the range of 90% to 110% (54 g to 66 g) of the weight of the "egg (60 g) or slow-cooked egg (60 g)" closest to the weight difference of 60 g, and hence the error message as illustrated in FIG. 12 is displayed.

Further, according to the above-mentioned embodiment, when the weight difference exceeds the predetermined value, the side items and/or included items close to the weight difference are identified without judging the magnitude of the weight difference per se. However, a configuration may be adopted in which, only when the weight difference exceeds the predetermined value and is another predetermined value (for example, 70% of the weight of the main item) or lower, side items and/or included items corresponding to the weight difference are identified. This is described in terms of the above-mentioned embodiment. The weight difference is 60 g, and the weight difference of 60 g exceeds the predetermined value (30 g) and is 70% (280 g) or lower of the weight of the "beef bowl (400 g)" as the main item. Therefore, the side items and/or included items close in weight to the weight difference are identified. Note that, the other predetermined value is a value smaller than the weight of the item having the smallest weight of the main items and larger than the weight of the item having the smallest weight of the side items and included items, and is registered in advance to the host 30 and may be changed afterward.

Further, in the above-mentioned embodiment, the configuration has been adopted in which the weight checker 60 measures the item weight, identifies items that are assumed to be a cause of the overweight/underweight, and displays the identified items. However, a configuration may be adopted in which only the item weight is measured on the weight checker 60 side, and the actual total weight result is received from the weight checker 60, the items that are assumed to be the cause of the overweight/underweight are identified, and the result of the identification is transmitted to the weight checker 60 on the host 30 side.

This application claims priority from Japanese Patent Application No. 2010-251040, filed on Nov. 9, 2010, the entire disclosure of which is incorporated herein by reference.

REFERENCE SIGNS LIST

30 . . . host
31 . . . memory unit
32 . . . input unit
33 . . . output unit
34 . . . control unit
34a . . . calculating section 34b . . . information generating section
35 . . . communication unit
36 . . . auxiliary storage device
40 . . . POS terminal (input unit)
50 . . . printer (issuing unit)
60 . . . weight checker
70 . . . measuring instrument terminal
71 . . . memory unit
72 . . . input unit
73 . . . output unit
73a . . . display (output unit)
74 . . . control unit
74a . . . judging section
75 . . . communication unit
76 . . . auxiliary storage device
80 . . . weight measuring instrument
81 . . . weight measuring unit
82 . . . barcode reader (reading unit)
83 . . . communication unit
90 . . . floor order slip
91 . . . barcode (identification code)

The invention claimed is:

1. A POS system, comprising;
an input unit for receiving an input of an order which includes ordered items that are classified into a main item, a side item, a set item of a combination of a main item and a side item, and an included item which is specified by a side item included in the set item and which is distinguished from the main item, the side item, and the set item;
a memory unit for storing item information containing an individual theoretical weight of each item;
a calculating section for calculating, based on input information containing item types and item quantities of ordered items input with the input means and on the item information, a theoretical total weight of the ordered items;
a weight measuring unit for measuring an actual total weight of the ordered items, which are put in a bag;
a judging section for comparing the theoretical total weight and the actual total weight, and when a weight difference there between exceeds a predetermined value and is lower than another predetermined value, identifying one or more of said side item and said included item close in weight to the weight difference from among a set of one or more side items and/or included items included in the ordered items;
an output unit for outputting the side item and/or included item identified by the judging section, as an item candidate corresponding to the weight difference, along with a quantity of each item; and
an information generating section operable, in response to an order, to generate order in response to an order, to generate order information concerned with one or more of the side item and the included item included in the order, by individually making the one or more of the side item and the included item correspond to an item name, a quantity, and an individual theoretical weight, by detecting whether or not the one or more of the side item and the included item include the same item names, and by obtaining the order information which is representative of a quantity corresponding to the item names by summing up an individual quantity of an individual item included in the one or more of the side item and the included item when the one or more of the side item and the included item include the same item names;
wherein:

the predetermined value is set to a value smaller than the weight of the item having the smallest weight of the side items and included items, and said another predetermined value is set to a value smaller than the weight of the main item;
the judging section identifies, based on the weight difference and the order information, the item name close in weight to the weight difference from among the ordered items; and
the output unit outputs as an item candidate corresponding to the weight difference, along with item name and a quantity of each item.

2. A POS system according to claim 1, wherein the judging section identifies the side item and/or included item closest in weight to the weight difference.

3. A POS system according to claim 1, wherein the judging section identifies a plurality of the side items and/or included items close in weight to the weight difference.

4. A POS system according to claim 1, further comprising:
issuing unit for issuing a sheet having printed thereon an identification code containing an order identification number that is unique to the order; and
reading unit for reading the identification code on the sheet.

5. A POS system according to claim 4, wherein the identification code further contains information on the theoretical total weight of the ordered items.

6. A POS system according to claim 1, wherein the output unit outputs the item type of the one or more of the side item and the included item identified by the judging section, along with an error message.

7. A POS system according to claim 6, wherein the output unit further outputs the weight difference.

8. A POS system, comprising;
an input unit for receiving an input of an order which includes ordered items that are classified into a main item, a side item, a set item of a combination of a main item and a side item, and an included item which is specified by a side item included in the set item and which is distinguished from the main item, the side item, and the set item;
a memory unit for storing item information containing an individual theoretical weight of each item;
a calculating section for calculating, based on input information containing item types and item quantities of ordered items input with the input means and on the item information, a theoretical total weight of the ordered items;
a weight measuring unit for measuring an actual total weight of the ordered items, which are put in a bag;
a judging section for comparing the theoretical total weight and the actual total weight, and when a weight difference there between exceeds a predetermined value and is lower than another predetermined value, specifying a set of all of the side items and included items close in weight to the weight difference from among a set of one or more side items and included items included in the ordered items;
an output unit for outputting the one or more of the side item and the included item specified by the judging section as an item candidate corresponding to the weight difference, along with the quantities of the each items; and
an information generating section operable in response to an order to generate order information concerned with the one of the side item and the included item included in the order, by individually making the one of the side item and the included item correspond to an item name, a quantity, and an individual theoretical weight, by detecting whether or not the one of the side item and the included item include the same item names, and by obtaining the order information which is representative of a quantity corresponding to the item names by summing up an individual quantity of an individual item included in the one of the side item and the included item when the one of the side item and the included item include the same item names;

wherein:

the predetermined value is set to a value smaller than the weight of the item having the smallest weight of the side items and included items, and said another predetermined value is set to a value smaller than the weight of the main item:

the judging section identifies, based on the weight difference and the order information, the item name close in weight to the weight difference from among the ordered items; and the output unit outputs as an item candidate corresponding to the weight difference, along with item name and a quantity of each item.

9. A POS system, comprising;

an input unit configured to receive an order of items, the items being classified into main items, side items, sets, and included items, each set including a combination of a main item and a side item, wherein, for each side item of each set a corresponding one of the included items is specified;

a memory unit configured to store item information indicating, for each of the items, an individual theoretical weight;

a calculating section configured to calculate a total theoretical weight of the items ordered based on the item information and a quantity of items in the order;

a scale configured to measure a total actual weight of items provided in fulfillment of the order;

a judging section configured to make a determination as to whether a weight difference between the total theoretical weight and the total actual weight exceed a first threshold, and when the determination is affirmative, to determine all side items and included items having said individual theoretical weight within a second threshold of the weight difference;

an output unit configured to indicate the determined side items and included items, specified by the judging section, as candidate items;

an information generating section configured to, in response to an order, generate order information concerned with the one of the side item and the included item included in the order, by individually making the one of the side item and the included item correspond to an item name, a quantity, and an individual theoretical weight, by detecting whether or not the one of the side item and the included item include the same item names, and by obtaining the order information which is representative of a quantity corresponding to the item names by summing up an individual quantity of an individual item included in the one of the side item and the included item when the one of the side item and the included item include the same item names;

wherein:

the first threshold is set to a value smaller than the weight of the item having the smallest weight of the side items and included items, and said second threshold is set to a value smaller than the weight of the main item;

the judging section is further configured to identify, based on the weight difference and the order information, the item name close in weight to the weight difference from among the ordered items; and the output unit is further configured to output as an item candidate corresponding to the weight difference, along with item name and a quantity of each item.

* * * * *

UNITED STATES PATENT AND TRADEMARK OFFICE
CERTIFICATE OF CORRECTION

PATENT NO. : 8,916,783 B2  
APPLICATION NO. : 13/821507  
DATED : December 23, 2014  
INVENTOR(S) : Hideyuki Tazawa Page 1 of 1

It is certified that error appears in the above-identified patent and that said Letters Patent is hereby corrected as shown below:

In the Claims

Column 9, Line 53: In Claim 1, after "generate order" delete "in response to an order, to generate order"

Column 11, Line 15: In Claim 8, delete "item:" and insert -- item; --

Signed and Sealed this  
Twenty-second Day of September, 2015

Michelle K. Lee  
*Director of the United States Patent and Trademark Office*